US008984976B2

(12) United States Patent
    Cavallino

(10) Patent No.: US 8,984,976 B2
(45) Date of Patent: Mar. 24, 2015

(54) TWO-SPEED TRANSMISSION FOR ELECTRIC VEHICLES

(75) Inventor: Carlo Cavallino, Turin (IT)

(73) Assignee: Oerlikon Graziano S.p.A., Rivoli (Turin) (IT)

( * ) Notice: Subject to any disclaimer, the term of this patent is extended or adjusted under 35 U.S.C. 154(b) by 411 days.

(21) Appl. No.: 12/894,407

(22) Filed: Sep. 30, 2010

(65) Prior Publication Data
    US 2011/0079097 A1    Apr. 7, 2011

(30) Foreign Application Priority Data
    Oct. 2, 2009   (IT) ............................... TO2009A0750

(51) Int. Cl.
    *F16H 3/08*    (2006.01)
    *F16H 3/10*    (2006.01)
    F16H 48/08    (2006.01)

(52) U.S. Cl.
    CPC    *F16H 3/10* (2013.01); *F16H 48/08* (2013.01); *F16H 2200/0034* (2013.01)
    USPC ............................................. 74/329; 74/325

(58) Field of Classification Search
    CPC ........................................................ F16H 3/10
    USPC ............... 74/325, 329, 331, 339, 340; 192/41
    See application file for complete search history.

(56) References Cited

U.S. PATENT DOCUMENTS

| 4,398,432 A * | 8/1983 | Quick ............................... 74/331 |
| 4,463,621 A * | 8/1984 | Fisher .............................. 74/330 |
| 4,489,621 A * | 12/1984 | McIntosh ........................ 74/355 |
| 4,576,063 A * | 3/1986 | Akashi et al. ................... 74/745 |
| RE33,551 E * | 3/1991 | Andersson et al. ............. 74/331 |
| 5,193,417 A | 3/1993 | Niiyama et al. |

(Continued)

FOREIGN PATENT DOCUMENTS

| DE | 4212324 A1 | 8/1992 |
| DE | 10347273 A1 | 4/2004 |

(Continued)

*Primary Examiner* — William Kelleher
*Assistant Examiner* — Terence Boes
(74) *Attorney, Agent, or Firm* — Husch Blackwell LLP

(57) ABSTRACT

The transmission comprises: a primary shaft; a secondary shaft; a gearing of first speed comprising a first driving gearwheel carried by the primary shaft and a first driven gearwheel carried by the secondary shaft and permanently meshing with the first driving gearwheel; a gearing of second speed comprising a second driving gearwheel carried by the primary shaft and a second driven gearwheel carried by the secondary shaft and permanently meshing with the second driving gearwheel; an overrunning clutch associated to one of the first driving gearwheel and first driven gearwheel to allow the transmission of the torque via the gearing of first speed only in the direction from the primary shaft to the secondary shaft; a first coupling device arranged to connect either of the first driving gearwheel and first driven gearwheel, namely the gearwheel to which the overrunning clutch is associated, for rotation directly with the respective shaft, so as to allow the transmission of the torque via the gearing of first speed also in the direction from the secondary shaft to the primary shaft; and a second coupling device arranged to connect either of the second driving gearwheel and second driven gearwheel for rotation with the respective shaft. The first and second coupling devices are both shiftable between an open condition and a closed condition independently of each other. The first coupling device is normally open, whereas the second coupling device is normally closed.

9 Claims, 3 Drawing Sheets

(56) References Cited

U.S. PATENT DOCUMENTS

| | | | |
|---|---|---|---|
| 5,289,890 A | 3/1994 | Toyoda et al. | |
| 5,493,927 A * | 2/1996 | Botterill et al. | 74/331 |
| 5,507,376 A * | 4/1996 | Skotnicki | 192/48.91 |
| 5,538,119 A * | 7/1996 | Johnson, Jr. | 192/53.34 |
| 5,547,057 A * | 8/1996 | Sperber | 192/53.34 |
| 6,634,247 B2 * | 10/2003 | Pels et al. | 74/329 |
| 7,469,613 B2 * | 12/2008 | Krauss et al. | 74/340 |
| 7,635,058 B2 * | 12/2009 | Moehlmann et al. | 192/48.601 |
| 7,779,712 B2 * | 8/2010 | Mesiti et al. | 74/330 |
| 7,832,298 B2 * | 11/2010 | Raszkowski | 74/329 |
| 7,930,086 B2 * | 4/2011 | Otsubo | 701/66 |
| 7,958,798 B2 * | 6/2011 | Hasegawa | 74/325 |
| 8,201,469 B2 * | 6/2012 | Akashi et al. | 74/329 |
| 8,210,063 B2 * | 7/2012 | Tsukada et al. | 74/33 |
| 2002/0104397 A1 * | 8/2002 | Bowen | 74/329 |
| 2002/0144563 A1 * | 10/2002 | Forsyth | 74/333 |
| 2003/0074991 A1 * | 4/2003 | Wafzig | 74/329 |
| 2003/0084738 A1 * | 5/2003 | Ishihara et al. | 74/329 |
| 2003/0166429 A1 * | 9/2003 | Tumback | 475/5 |
| 2003/0168302 A1 * | 9/2003 | Diemer et al. | 192/48.1 |
| 2008/0227592 A1 * | 9/2008 | Steffen et al. | 477/19 |
| 2010/0120580 A1 * | 5/2010 | Mepham et al. | 477/3 |

FOREIGN PATENT DOCUMENTS

| | | |
|---|---|---|
| EP | 1300601 A1 | 4/2003 |
| EP | 1835204 A1 | 9/2007 |
| GB | 700367 A | 12/1953 |

* cited by examiner

TWO-SPEED TRANSMISSION FOR ELECTRIC VEHICLES

CROSS REFERENCE TO RELATED APPLICATION

This application claims priority under 35 U.S.C. §119 to Italian Patent Application No. TO2009A000750, filed on Oct. 2, 2009 in the Italian Intellectual Property Office, the disclosure of which application is incorporated herein by reference in its entirety.

BACKGROUND OF THE INVENTION

The present invention relates to a two-speed transmission intended to be used on electric vehicles. The expression "electric vehicles" is used in the following description and claims to indicate all those vehicles which use an electric machine as prime mover, the electric machine being the only prime mover (it is the case of purely electric vehicles) or being associated to an internal combustion engine (it is the case of hybrid vehicles).

Transmissions having more than one speed, in particular two-speed transmissions, for use on electric vehicles are known and have the advantage, over single-speed transmissions, of allowing the electric machine to work at the optimal number of revolution per minute, that is to say, at the number of revolutions per minute corresponding to the maximum efficiency of the machine, over a wider speed range of the vehicle. This advantage applies both to the traction operating mode, in which the electric machine operates as a motor to generate the power required to move the vehicle, and to the regeneration operating mode, in which the electric machine operates as a generator to convert the kinetic energy of the vehicle, when this latter is decelerating, into electric energy.

In order to avoid interruption in the transmission of the torque (the so-called "torque hole") when shifting from the first speed (i.e. the low speed) to the second speed (i.e. the high speed) in a two-speed transmission for electric vehicles, it is known from DE4212324 the use of an overrunning clutch associated to the driven gearwheel of the gearing of first speed. More specifically, the two-speed transmission known from this prior art document comprises a primary shaft, a secondary shaft, a gearing of first speed comprising a first driving gearwheel carried by the primary shaft and a first driven gearwheel carried by the secondary shaft and permanently meshing with the first driving gearwheel, a gearing of second speed comprising a second driving gearwheel carried by the primary shaft and a second driven gearwheel carried by the secondary shaft and permanently meshing with the second driving gearwheel, an overrunning clutch associated to the first driven gearwheel, a first coupling device arranged to couple the second driven gearwheel for rotation with the secondary shaft, and a second coupling device arranged to couple the first driven gearwheel, to which the overrunning clutch is associated, for rotation directly with the secondary shaft, so as to allow the transmission of the torque via the gearing of first speed also in the direction from the secondary shaft to the primary shaft. According to such a known solution, both the coupling devices are of the normally open type, that is to say, at rest (no command actively applied to the device) they are in the open condition in which they do not couple the respective gearwheel for rotation with the respective shaft. Moreover, the two coupling devices are controlled by a single control mechanism which alternatively closes either of the coupling devices.

SUMMARY OF THE INVENTION

It is an object of the present invention to provide a two-speed transmission for electric vehicles of the above-identified type, which offers better performances and a wider range of operating modes than the prior art discussed above.

This and other objects are fully achieved according to the present invention by virtue of a two-speed transmission for electric vehicles in which a normally closed coupling device is used as a second coupling device (i.e. as coupling device associated to the second speed) and in which the first and second coupling devices are controllable independently of each other, in such a manner that the second coupling device is shiftable between the open condition and the closed condition independently of the open or closed position of the first coupling device.

By virtue of the second coupling device being of the normally closed type, the electric vehicle equipped with a two-speed transmission according to the invention can run in second speed (which is by far the most frequent operating condition for a vehicle of this kind) without having to impart actively any command to the coupling devices of the transmission, which results in less energy consumption. Moreover, by virtue of the two coupling devices being controllable independently of each other, it is possible to close the first coupling device without opening the second coupling device, thereby obtaining a condition in which both the coupling devices are closed and a vehicle parking function is provided.

BRIEF DESCRIPTION OF THE DRAWINGS

Further characteristics and advantages of the present invention will result from the following detailed description, given purely by way of non-limiting example with reference of the appended drawings, in which.

DETAILED DESCRIPTION OF THE PREFERRED EMBODIMENTS

Figure 1A:
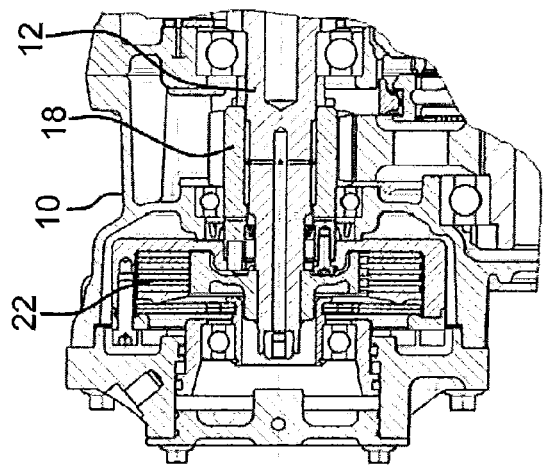
FIG. 1A is a section view in the same section plane as that of FIG. 1, showing in detail a variant of the coupling device associated to the second speed.
Figure 1:
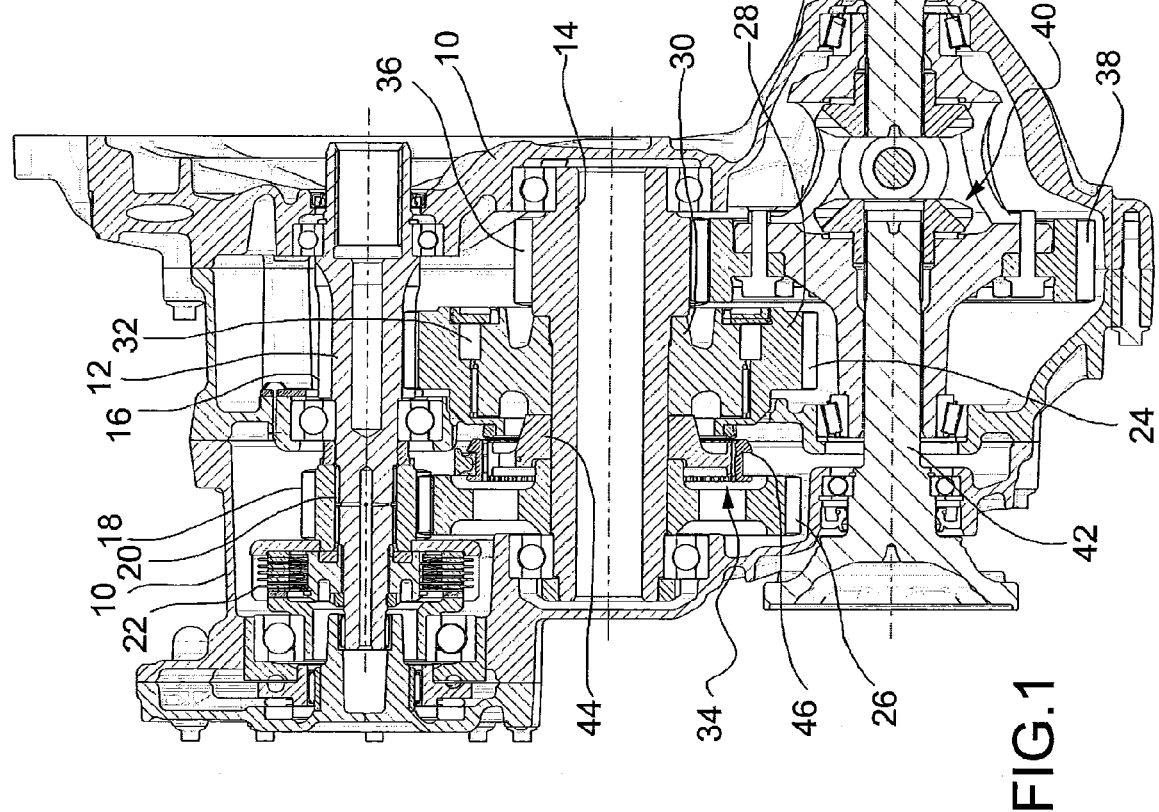
FIG. 1 is a section view of a two-speed transmission for electric vehicles according to a preferred embodiment of the present invention.

With reference first to FIG. 1, a two-speed transmission for electric vehicles according to a preferred embodiment of the present invention comprises a casing or housing 10, a primary shaft 12 supported for rotation by the casing 10, and a secondary shaft 14 supported for rotation by the casing 10 and arranged parallel to the primary shaft 12.

The primary shaft 12 carries a first driving gearwheel 16 for the first speed (i.e. the low speed) and a second driving gearwheel 18 for the second speed (i.e. the high speed). In the illustrated embodiment, the first driving gearwheel 16 is fixed, that is to say, rigidly connected for rotation with the respective shaft (primary shaft 12), and more particularly it is made in a single piece with the primary shaft 12, whereas the second driving gearwheel 18 is idle, that is to say, free to rotate relative to the primary shaft 12, on which it is supported for example by means of needle bearing(s) 20. The primary shaft 12 is also provided with a first coupling device 22 which is made for example as a friction clutch and is associated to the second driving gearwheel 18. The first coupling device 22 is of the normally open type and therefore at rest it keeps the second driving gearwheel 18 connected for rotation with the primary shaft 12, whereas when it is actively controlled (for instance mechanically, hydraulically or electrically) it disconnects the second driving gearwheel 18 for rotation from the primary shaft 12. In the embodiment illustrated in FIG. 1, the coupling device 22 is a wet multi-disc friction clutch, but it might naturally be a friction clutch of different type as well, for example a dry single-disc or multi-disc friction clutch, as shown in FIG. 1A.

The secondary shaft 14 carries a first driven gearwheel 24 for the first speed and a second driven gearwheel 26 for the second speed.

The first driven gearwheel 24 comprises an idle ring gear 28 permanently meshing with the first driving gearwheel 16, a hub 30 rigidly connected for rotation with the secondary shaft 14 (in the illustrated example the hub 30 is made as a separate piece with respect to the secondary shaft 14 and is firmly secured thereto, but might naturally be made in a single piece with the secondary shaft 14 as well) and an overrunning clutch 32 (also known as freewheel), which is interposed between the ring gear 28 and the hub 30 of the first driven gearwheel 24 and is arranged to couple these two components of the first driven gearwheel for rotation with each other when the primary shaft 12 transmits torque to the secondary shaft 14 (traction phase) and until the angular velocity of the secondary shaft 14 (and, hence of the hub 30) is lower than or equal to the angular velocity of the primary shaft 12 divided by the transmission ratio of first speed. The first driven gearwheel 24, or better its ring gear 28, has been defined above as "idle" to mean that this ring gear is not rigidly connected for rotation with the respective shaft (secondary shaft 14), unlike the other gearwheel 16 of the gearing of first speed, but in certain operating conditions (those where the overrunning clutch 32 disconnects the ring gear 28 for rotation from the hub 30) it is free to rotate relative to the shaft 14.

In the illustrated embodiment, the second driven gearwheel 26 is made as a fixed wheel, that is to say, it is rigidly connected for rotation with the secondary shaft 14, and permanently meshes with the second driving gearwheel 18. The secondary shaft 14 carries also a second coupling device 34 arranged to couple the ring gear 28 of the first driven gearwheel 24 for rotation with the secondary shaft 14. The coupling device 34 may be made either as a normally closed coupling device, in which case it keeps at rest the ring gear 28 of the first driven gearwheel 24 connected for rotation with the secondary shaft 14, or as a normally open coupling device, in which case it keeps at rest the ring gear 28 of the first driven gearwheel 24 free to rotate relative to the secondary shaft 14. The secondary shaft 14 carries also a final reduction pinion 36, which in the illustrated embodiment is made in a single piece with the secondary shaft 14. The final reduction pinion 36 permanently meshes with a ring gear 38 of a differential 40 interposed between a pair of axle shafts 42 on which the driving wheels (not shown) are mounted.

Figure 3:
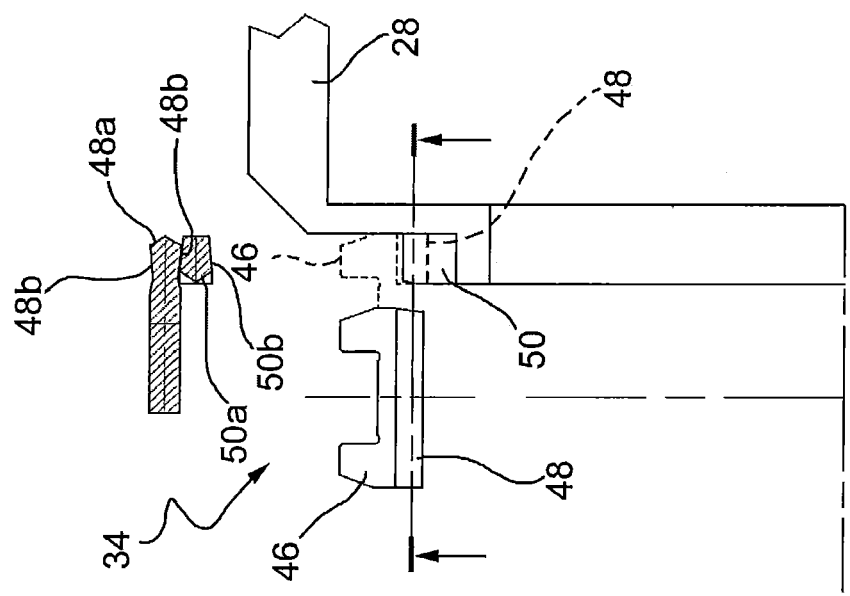
FIG. 3 is a schematic illustration of the engagement teeth of the sliding sleeve of the coupling device associated to the first speed and of the idle gearwheel of the gearing providing the first speed.
Figure 2:
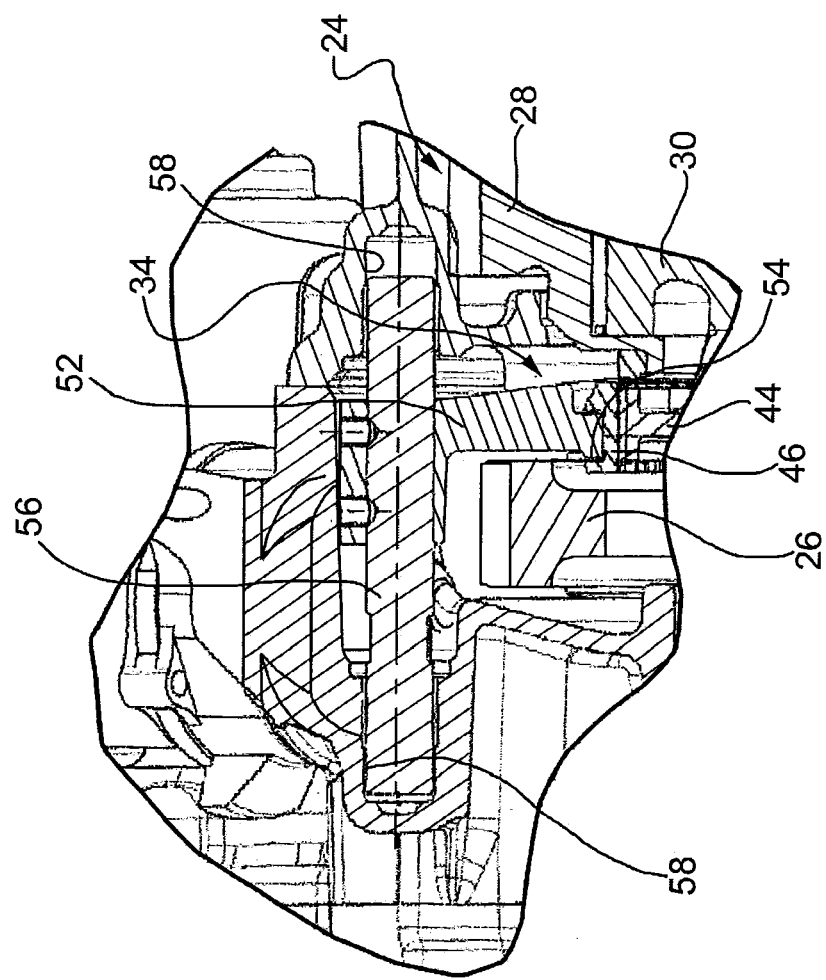
FIG. 2 is a section view, in a section plane different from that of FIG. 1, showing on an enlarged scale the control mechanism of the coupling device associated to the second speed.

With reference also to FIG. 2, the second coupling device 34 comprises a hub 44 rigidly connected for rotation with the secondary shaft 14 and a sliding sleeve 46 connected to the hub 44 by means of a splined profile so as to be rigidly connected for rotation with the hub, but free to translate axially relative thereto. As can be better seen in FIG. 3, at the end facing the first driven gearwheel 24, the splined profile of the sliding sleeve 46 forms first engagement teeth 48 arranged to mesh with second engagement teeth 50 formed by the ring gear 28 of the first driven gearwheel 24. In the example illustrated in FIG. 3, the engagement teeth 48 and 50 have in plan view a V-shaped front end (indicated 48a and 50a for the teeth 48 and the teeth 50, respectively) and a pair of inclined flanks (indicated 48b and 50b for the teeth 48 and the teeth 50, respectively) diverging outwards. In order to cause the sliding sleeve 46 to move between a disengagement position (shown in solid line in FIG. 3), in which the engagement teeth 48 and 50 are disengaged, and an engagement position (shown in broken line in FIG. 3), in which the engagement teeth 48 and 50 mesh with each other, whereby the ring gear 28 of the first driven gearwheel 24 is connected for rotation with the secondary shaft 14, the transmission is further provided with a control mechanism (shown in detail in FIG. 2), which in the illustrated embodiment comprises a sliding actuating fork 52 which engages in a circumferential groove 54 of the sliding sleeve 46. In the illustrated embodiment, the actuating fork is secured to a sliding rod 56 guided at the opposite ends within respective coaxial guide cavities 58 formed by the casing 10. The translational movement of the sliding rod 56 is controlled by an actuator device (not shown), which may be of hydraulic or electric type. However, the mechanism for actuating the sliding sleeve 46 of the second coupling device 34 may naturally be of any other type.

The operation of the two-speed transmission for electric vehicles illustrated above in structural terms will be described now.

With the friction clutch 22 kept open (by command imparted by the respective control device), as soon as the electric motor starts to run, the driving torque is transmitted from the primary shaft 12 to the secondary shaft 14 via the first driving gearwheel 16 and the first drive gearwheel 24 forming the gearing of first speed, the ring gear 28 of the first driven gearwheel 24 being connected for rotation with the hub 30, and therefore to the secondary shaft 14, by means of the overrunning clutch 32. Preferably, as soon as the vehicle starts to move, the coupling device 34 is closed (in case of normally open device) or kept closed (in case of normally closed device) to couple the ring gear 28 of the first driven gearwheel 24 for rotation with the secondary shaft 14. In this way, even though the torque is still transmitted from the primary shaft 12 to the secondary shaft 14 preferably via the overrunning clutch 32, due to the fact that the plays inside the overrunning clutch 32 are suitably chosen so as to be smaller than the plays between the engagement teeth 48 and 50 of the sliding sleeve 46 and of the ring gear 28, the sliding sleeve 46 is already in the engagement position and therefore the transmission is immediately able to operate also in regeneration mode with the first speed engaged. In fact, in case of braking (or, more generally, in case of deceleration) or downhill, the torque is transmitted from the driving wheels to the electric machine flowing in the order via the secondary shaft 14, the hub 44 and the sliding sleeve 46 of the coupling device 34, the ring gear 28, the first driving gearwheel 16 and the primary shaft 12, the electric machine operating accordingly as a generator to charge the batteries of the vehicle. When running in first speed (that is to say, in the illustrated embodiment, with the friction clutch 22 open), the second driving gearwheel 18 rotates idly both in traction mode and in regeneration mode, as it is driven for rotation by the second driven gearwheel 26 with which it permanently meshes.

In order to allow to shift from the first speed to the second speed, the coupling device 34 is opened, thus disengaging the engagement teeth 48 of the sliding sleeve 46 from the engagement teeth 50 of the ring gear 28 and hence causing the torque to be transmitted from the primary shaft 12 to the secondary shaft 14 via the overrunning clutch 32. The coupling device 22 is then brought in its normal closed condition, whereby the second driving gearwheel 18 is connected for rotation with the primary shaft 12. In this way, as soon as the angular velocity of the ring gear 28 becomes lower than the angular velocity of the hub 30, i.e. of the secondary shaft 14, the overrunning clutch 32 is "by-passed" and therefore the driving torque is transmitted from the primary shaft 12 to the secondary shaft 14 via the driving gearwheel 18 and the driven gearwheel 26 of the gearing of second speed. The use of the overrunning clutch 32 for transmission of the torque via the gearing of first speed, which clutch works in parallel to the gearing of second speed when the second driving gearwheel 18 is coupled for rotation with the primary shaft 12 once the coupling device 22 is closed, makes it possible to shift from the first to the second speed without interruptions in the transmission of the torque, that is to say, in the so-called "power-shift" mode. With the second speed engaged, the operation in regeneration mode is enabled by the fact that the driving gearwheel 18 and the driven gearwheel 26 of the gearing of second speed permanently mesh with each other.

Figure 4A:
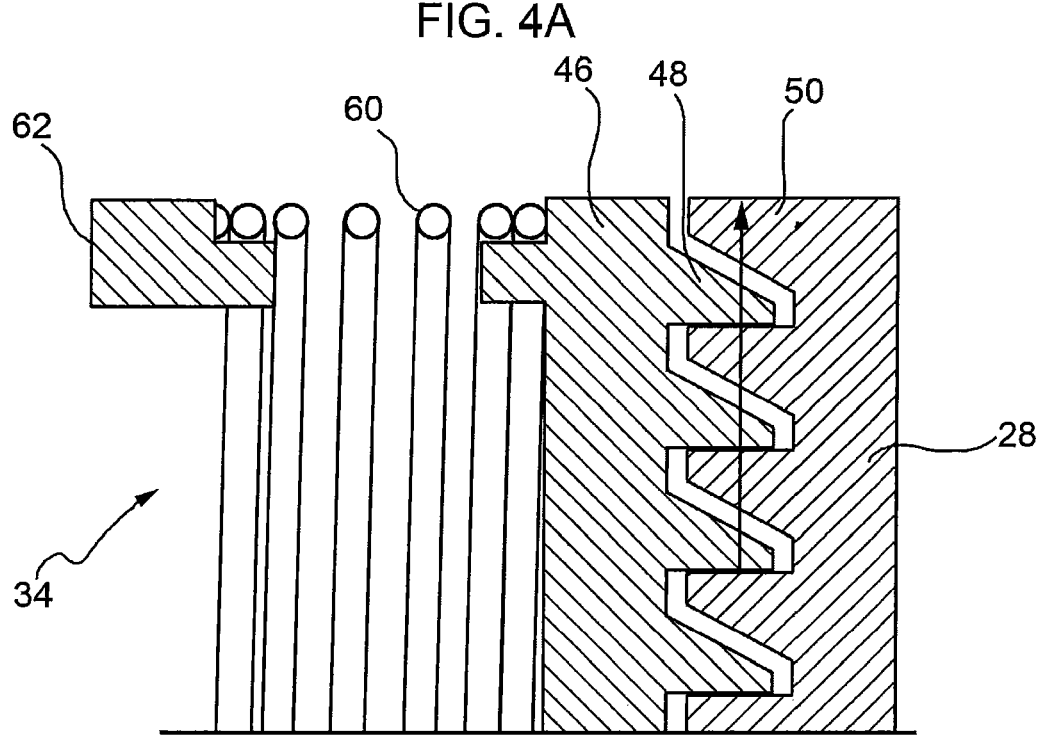
FIGS. 4A and 4B are schematic illustrations of a variant of the engagement teeth of the sliding sleeve of the coupling device associated to the first speed and of the idle gearwheel of the gearing proving the first speed, in the engaged (or closed) condition and in the disengaged (or open) condition of this coupling device, respectively.
Figure 4B:
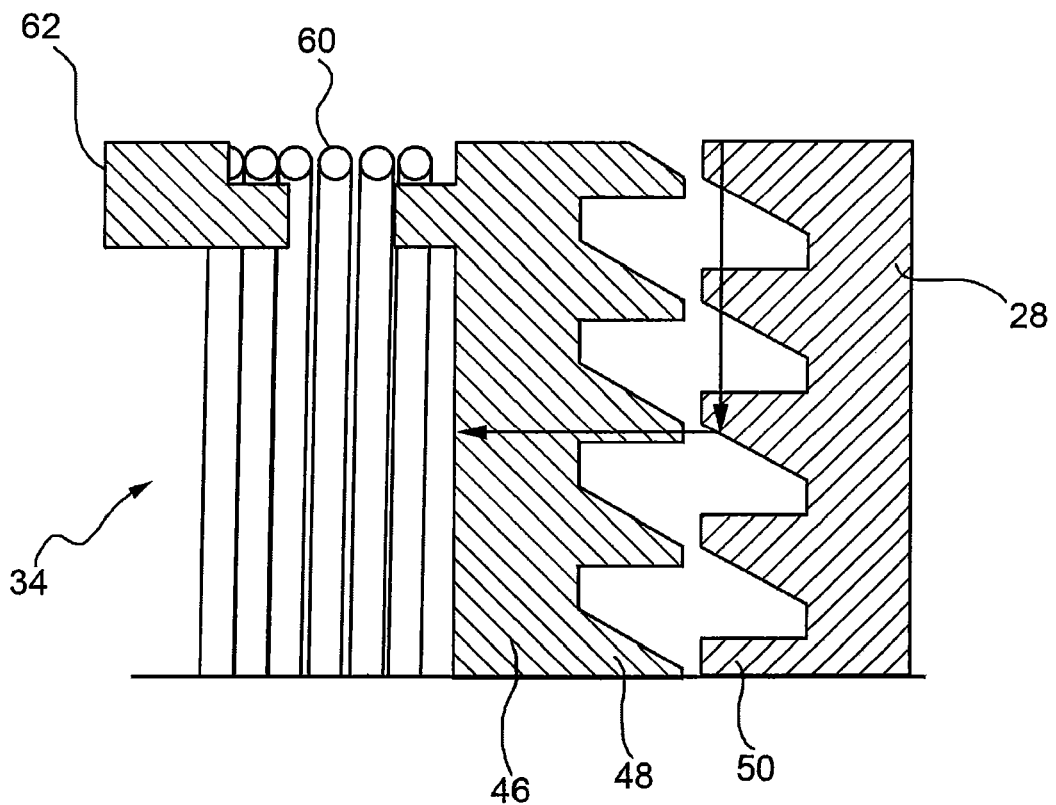

FIGS. 4A and 4B, where parts and elements identical or corresponding to those of the preceding figures are given the same reference numerals, show an alternative embodiment of the coupling device associated to the first speed, according to which the engagement teeth of the sliding sleeve and of the ring gear of the first driven gearwheel are made as sawtoothed teeth. More specifically, the coupling device 34 comprises a sliding sleeve 46, which is connected for rotation with the secondary shaft 14 and is axially slidable between an engagement position (FIG. 4A), in which the engagement teeth 48 of the sliding sleeve 46 mesh with the engagement teeth 50 of the ring gear 28, and a disengagement position (FIG. 4B), in which the engagement teeth 48 and 50 are disengaged from each other, and a spring 60 interposed between a stationary ring 62 and the sliding sleeve 46 to urge axially this latter towards the ring gear 28. The inclined flanks of the engagement teeth 48 and 50 are oriented in such a manner that in the traction operating mode with the first speed engaged, in which mode the torque flows from the ring gear 28 to the sliding sleeve 46, the axial component of the force exchanged between the engagement teeth 48 and 50 tends to move the sliding sleeve 46 away from the ring gear 28 against the resilient force of the spring 60, thereby causing the engagement teeth 48 and 50 to disengage from each other (FIG. 4B). In this operating mode, the sliding sleeve 46 is kept in the disengagement position either electromagnetically or hydraulically or, again, mechanically by means of an actuating device acting directly on the sliding sleeve or indirectly through a rod and fork mechanism such as the one described above with reference to FIG. 2. The torque is therefore transmitted from the primary shaft 12 to the secondary shaft 14 via the overrunning clutch 32.

As soon as the traction request ceases, the sliding sleeve 46 is unlocked and, being no more opposed by the axial force applied by the engagement teeth 50 of the ring gear 28, shifts from the disengagement position to the engagement position under the action of the spring 60. In that condition, the torque is transmitted from the secondary shaft 14 to the primary shaft 12 due to the engagement between the engagement teeth 48 and 50 of the sliding sleeve 46 and of the ring gear 28, and more in particular between the flat faces of those teeth (FIG. 4A).

In the traction operating mode with the second speed engaged, the overrunning clutch is "by-passed" and, like the case where the first speed is engaged, the axial component of the force applied by the inclined flanks of the engagement teeth 50 of the ring gear 28 on the inclined flanks of the engagement teeth 48 of the sliding sleeve 46 causes this latter to shift from the engagement position to the disengagement position.

According to a further variant of embodiment, not illustrated, the spring may be replaced by a special actuating device (for example of electro-magnetic, hydraulic or mechanical type) arranged to control the movement of the sliding sleeve from the disengagement position to the engagement position, while a locking device is still provided and may also be for example of electromagnetic, hydraulic or mechanical type, the locking device being arranged to keep the sliding sleeve in the disengagement position during operation in traction mode.

Advantageously, in a transmission according to the invention the parking function can be provided by using the sliding sleeve of the coupling device associated to the first speed as parking device. When the vehicle is stationary, in fact, since the coupling device associated to the second speed is of normally closed type, both the gearwheels of the gearing of second speed are connected for rotation to the respective shaft, and therefore, if the coupling device associated to the first speed is also brought or kept in the closed condition (which is allowed by the fact that this coupling device can be in the open or closed condition independently of the open or closed condition of the other coupling device), also the first speed is simultaneously engaged and the transmission is therefore locked.

As already mentioned in the introductory part of the description, a further advantage of the transmission according to the invention is that the use of a normally closed coupling device as the coupling device associated to the second speed allows to drive in second speed (which is by far the most frequent operating condition of the vehicle) without imparting any command to that coupling device, which results in the energy consumption of the vehicle being brought to a minimum level.

Naturally, the principle of the invention remaining unchanged, the embodiments and manufacturing details may be widely varied from those described and illustrated purely by way of non-limiting example, without thereby departing from the scope of the invention as defined in the attached claims.

For example, as discussed above, FIG. 1 illustrates a transmission in which the driven gearwheel 24 of the first speed and the driving gearwheel 18 of the second speed are idle. The overrunning clutch 32 and the second coupling device 34 are therefore associated with the driven gearwheel 24, while the first coupling device 22 is associated with the driving gearwheel 18. The transmission may also be produced with the driving gearwheel 16 being the idle wheel of the gearing of first speed, in which case the overrunning clutch 32 will be associated to the driving gearwheel 16, instead of the driven gearwheel 24, of first speed and/or with the driven gearwheel 26 being the idle wheel of the gearing of second speed, in which case the coupling device 22 associated to the second speed will act on the driven gearwheel 26, instead of the driving gearwheel 24, of the gearing of second speed.

Moreover, even though the transmission illustrated in the drawings is arranged transversely, that is to say, with the primary and secondary shafts oriented transversely relative to the running direction of the vehicle, and hence parallel to the axes of the wheels, the present invention also encompasses a longitudinal arrangement of the transmission, that is to say, with the primary and secondary shafts oriented parallel to the running direction of the vehicle, and hence transversely relative to the axes of the wheels.

What is claimed is:

1. A two-speed transmission for electric vehicles provided with an electric machine able to operate alternatively as a motor according to a traction operating mode or as a generator according to a regeneration operating mode, the transmission comprising:
   a primary shaft;
   a secondary shaft;
   a gearing of first speed, or low speed, comprising a first driving gearwheel carried by the primary shaft and a first driven gearwheel carried by the secondary shaft and permanently meshing with the first driving gearwheel;
   a gearing of second speed, or high speed, comprising a second driving gearwheel carried by the primary shaft and a second driven gearwheel carried by the secondary shaft and permanently meshing with the second driving gearwheel;
   an overrunning clutch associated to said first driven gearwheel to allow the transmission of the torque via the gearing of first speed only in the direction from the primary shaft to the secondary shaft;
   a first coupling device selectively coupling said second driving gearwheel for rotation with the primary shaft, said first coupling device being shiftable between an open condition and a closed condition; and
   a second coupling device selectively coupling said first driven gearwheel, namely the gearwheel to which the overrunning clutch is associated, for rotation directly with the secondary shaft, said second coupling device being shiftable between an open condition and a closed condition;
   characterized in that said first coupling device is normally closed and is shiftable between the open condition and the closed condition independently of the open or closed condition of said second coupling device.

2. The transmission according to claim 1, wherein said second coupling device is normally open.

3. The transmission according to claim 1, wherein said first driving gearwheel is permanently connected for rotation with the primary shaft, whereas said first driven gearwheel is connectable for rotation with the secondary shaft via the overrunning clutch, and wherein said second driven gearwheel is permanently connected for rotation with the secondary shaft, whereas said second driving gearwheel is idly mounted on the primary shaft and is connectable for rotation with this latter by means of said first coupling device.

4. The transmission according to claim 1, wherein said first driven gearwheel comprises a ring gear permanently meshing with said first driving gearwheel, and wherein the overrunning clutch is radially interposed between the ring gear and the secondary shaft.

5. The transmission according to claim 1, wherein said second coupling device comprises a sliding sleeve provided with first engagement teeth arranged to mesh with second engagement teeth of said first driven gearwheel, the sliding sleeve being connected for rotation with the secondary shaft and being axially slidable between a disengagement position, in which said first and second engagement teeth are disengaged from each other, and an engagement position, in which said first and second engagement teeth mesh with each other, whereby said first driven gearwheel is connected for rotation with the secondary shaft.

6. The transmission according to claim 5, wherein said second coupling device further comprises an actuating mechanism arranged to cause the sliding sleeve to move between said engagement and disengagement positions.

7. The transmission according to claim 6, wherein said first and second engagement teeth are saw-toothed teeth made in such a manner that, in traction operating mode with the first speed engaged, the sliding sleeve is moved into the disengagement position by the axial component of the force exchanged between said first and second engagement teeth.

8. The transmission according to claim 7, wherein the actuating mechanism comprises at least one spring tending to urge the sliding sleeve towards the engagement position or the disengagement position.

9. The transmission according to claim 1, wherein said first coupling device is a friction clutch.

* * * * *